(12) United States Patent
Maganas et al.

(10) Patent No.: US 6,520,287 B2
(45) Date of Patent: *Feb. 18, 2003

(54) METHODS AND SYSTEMS FOR LOW TEMPERATURE CLEANING OF DIESEL EXHAUST AND OTHER INCOMPLETE COMBUSTION PRODUCTS OF CARBON-CONTAINING FUELS

(75) Inventors: Thomas C. Maganas, Manhattan Beach, CA (US); Alan L. Harrington, Roseville, CA (US)

(73) Assignee: Maganas OH Radicals, Inc., Manhattan Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/859,905

(22) Filed: May 17, 2001

(65) Prior Publication Data

US 2002/0003060 A1 Jan. 10, 2002

Related U.S. Application Data

(63) Continuation-in-part of application No. 09/778,418, filed on Feb. 7, 2001, and a continuation-in-part of application No. 09/307,145, filed on May 7, 1999, now Pat. No. 6,235,247, which is a continuation-in-part of application No. 09/257,458, filed on Feb. 25, 1999, now abandoned, and a continuation-in-part of application No. 08/985,339, filed on Dec. 4, 1997, now Pat. No. 5,928,618.

(60) Provisional application No. 60/183,088, filed on Feb. 15, 2000.

(51) Int. Cl.$^7$ ................................................. F01N 1/24

(52) U.S. Cl. ...................... 181/258; 181/238; 181/248; 181/249

(58) Field of Search ................................ 181/258, 238, 181/248–251, 268, 211

(56) References Cited

U.S. PATENT DOCUMENTS 2,956,865 A * 10/1960 Williams, Sr. .............. 422/171

(List continued on next page.)

FOREIGN PATENT DOCUMENTS

| EP | 0 176 123 A1 | 4/1986 |
| EP | 0 605 719 A1 * | 7/1994 |
| FR | 2687765 A1 | 2/1992 |

(List continued on next page.)

OTHER PUBLICATIONS

Agarwal, Kedar, *Pyrolysis of Polymer Waste,* pp. 232–245, Society of Plastic Engineers, "Plastics Recycling: Technology Charts the Course," (Nov. 4, 1994).

(List continued on next page.)

*Primary Examiner*—Shih-Yung Hsieh
(74) *Attorney, Agent, or Firm*—Workman, Nydegger & Seeley

(57) ABSTRACT

Systems and apparatus for degrading and cleaning combustion products of carbon-containing fuels such as fossil fuels. The systems and apparatus utilize catalytically reactive particles that are at least partially suspended by moving gases within a reaction chamber and maintained at a temperature sufficient to cause the suspended media particles, typically silica sand, silica gel, or alumina, to become catalytically reactive in the presence of moisture. Typically, the reaction chamber is maintained at a temperature in a range from about 30° C. to about 500° C. Moisture may be provided by the waste exhaust, although additional moisture may be introduced into the reaction chamber in order to maintain reactivity of the catalytically reactive particles. The systems and apparatus can be adapted to be used in combination with diesel engines or other internal combustion engines and industrial burners. The exhaust gases containing the incomplete combustion products can be further pressurized as needed. Such systems also reduce nitrogen oxides ($NO_x$), $SO_2$ and $CO_2$ found in exhaust gases.

28 Claims, 7 Drawing Sheets

U.S. PATENT DOCUMENTS

| | | | | | |
|---|---|---|---|---|---|
| 3,632,304 | A | * | 1/1972 | Hardison | 423/245.3 |
| 3,714,071 | A | | 1/1973 | Michalko | 502/8 |
| 3,841,242 | A | | 10/1974 | Sigg | 110/257 |
| 3,915,890 | A | * | 10/1975 | Soldate | 423/659 |
| 3,922,975 | A | * | 12/1975 | Reese | 110/216 |
| 4,052,173 | A | | 10/1977 | Schultz | 48/202 |
| 4,308,806 | A | | 1/1982 | Uemura et al. | 110/244 |
| 4,330,513 | A | * | 5/1982 | Hunter et al. | 423/245.3 |
| 4,497,637 | A | | 2/1985 | Purdy et al. | 48/111 |
| 4,623,400 | A | | 11/1986 | Japka et al. | 148/283 |
| 4,701,312 | A | * | 10/1987 | Kice | 423/213.7 |
| 4,708,067 | A | * | 11/1987 | Narisoko et al. | 110/245 |
| 4,724,776 | A | * | 2/1988 | Foresto | 110/235 |
| 4,761,270 | A | * | 8/1988 | Turchan | 423/235 |
| 4,886,001 | A | | 12/1989 | Chang et al. | 110/346 |
| 4,974,531 | A | | 12/1990 | Korenberg | 110/346 |
| 4,977,840 | A | | 12/1990 | Summers | 110/346 |
| 4,991,521 | A | | 2/1991 | Green et al. | 110/347 |
| 5,010,830 | A | | 4/1991 | Asuka et al. | 110/347 |
| 5,178,101 | A | * | 1/1993 | Bell | 122/4 D |
| 5,181,795 | A | | 1/1993 | Circeo, Jr. et al. | 405/128 |
| 5,207,734 | A | * | 5/1993 | Days et al. | 60/278 |
| 5,335,609 | A | | 8/1994 | Nelson et al. | 110/346 |
| 5,347,936 | A | | 9/1994 | Thorhuus | 110/260 |
| 5,676,070 | A | | 10/1997 | Maganas et al. | 110/245 |
| 5,928,618 | A | * | 7/1999 | Maganas et al. | 358/1.15 |

FOREIGN PATENT DOCUMENTS

| | | |
|---|---|---|
| FR | 2701223 A1 | 8/1994 |
| GB | 541962 | 12/1941 |
| JP | 55-24597 | 2/1980 |
| JP | 358095192 * | 6/1983 |
| JP | 5-115752 | 5/1993 |
| WO | WO 93/24207 | 12/1993 |

OTHER PUBLICATIONS

Conversion Technology, Inc., *Source Test Report: Fluid Bed Stripping For Particulates, Metals, POHCS,* (1991).

Durham et al., *Carbothermal Synthesis of Silicon Nitride: Effect of Reaction Conditions,* 31–37, 211, 213–215, J. Am. Ceram. Soc., vol. 74 [1] (1991).

Guedes De Carvalho et al., *Mass Transfer Around Carbon Particles Burning In Fluidised Beds,* 63–70, Trans. IChemE., vol. 69, Part A (1991).

Homsy et al., *Report Of A Symposium On Mechanics Of Fluidized Beds,* 477–495, J. Fluid Mech., vol. 236 (1992).

Jean et al., *Fluidization Behavior Of Polymeric Particles In Gas–Solid Fluidized Beds,* 325–335, Chemical Engineering Science, vol. 47, No. 2 (1992).

Kuipers et al., *A Numerical Model Of Gas–Fluidized Beds,* 1913–1924, Chemical Engineering Science, vol. 47, No. 8 (1992).

Molerus, O., *Heat Transfer In Gas Fluidized Beds, Part 1,* 1–14, Powder Technology, 70(1992).

Shafey et al., *Experimental Study On A Bench–Scale, Batch–Type Fluidized–Bed Combustor For Energy Production From Waste–Derived Fuels,* 331–338, Energy, vol. 17, No. 4 (1992).

Seghers Engineering, *Segers Zerofuel: A Concept For Autothermal Sludge Incineration* (1992).

* cited by examiner

METHODS AND SYSTEMS FOR LOW TEMPERATURE CLEANING OF DIESEL EXHAUST AND OTHER INCOMPLETE COMBUSTION PRODUCTS OF CARBON-CONTAINING FUELS

RELATED APPLICATION

This application is a continuation-in-part of copending U.S. application Ser. No. 09/778,418, filed Feb. 7, 2001, which claims the benefit under 35 U.S.C. §119 of U.S. provisional application No. 60/183,088, filed Feb. 15, 2000. This application is also a continuation-in-part of U.S. application Ser. No. 09/307,145, filed May 7, 1999, now U.S. Pat. No. 6,235,247, which is a continuation-in-part of U.S. application Ser. No. 08/985,339, filed Dec. 4, 1997, now issued U.S. Pat. No. 5,928,618, and a continuation-in-part of U.S. application Ser. No. 09/257,458, filed Feb. 25, 1999, now abandoned. For purposes of disclosure, the foregoing patents and applications are incorporated herein by reference.

BACKGROUND OF THE INVENTION

1. Field of the Invention

The invention is in the field of pollution control, particularly in the remediation and cleaning of incomplete combustion products of carbon-containing fuels. More particularly, the present invention is in the field of the degradation and cleaning of incomplete combustion products like soot, hydrocarbons, carbon monoxide and other pollutants produced by internal combustion engines, such as diesel engines, and industrial burners, such as those that burn coal, fuel oil or other carbon-containing fuels.

2. Review of the Relevant Technologies

Modem society has mastered the art of producing new goods but struggles to dispose of its wastes. One problem associated with the modem economy involves pollutants that are produced by burning carbon-containing fuels, mainly fossil fuels, such as by internal combustion engines and industrial burners. The incomplete combustion of carbon-containing fuels such as gasoline, diesel fuel, fuel oil, coal, wood, biomass and even natural gas can result in the generation of pollutants such as carbon particulates, hydrocarbons, soot, oily substances, carbon monoxide (CO) and other pollutants. Such pollutants collect in the atmosphere and can cause all manner of health problems and smog. In response to the buildup of atmospheric pollution governments have attempted to legislate strict controls on the output of pollution generated by carbon-containing fuels.

For example, in response to pollution caused by gasoline-powered internal combustion engines, catalytic converters have been developed and mandated to reduce the levels of incomplete combustion pollutants emitted into the environment by gasolinepowered vehicles. Catalytic converters are typically positioned in-line with the exhaust and muffling system of an internal combustion engine and are generally able to catalytically convert most of the unburnt hydrocarbons and CO into $CO_2$ and water. Conventional catalytic converters contain palladium or platinum, which are coated on top of carrier beads or pellets made of inert and heat-resistant materials such as ceramics in order to increase the surface area of the active catalyst and keep them from simply blowing out the exhaust pipe. Surface coating a less expensive substrate with the catalytic metal also decreases the cost of the catalyst particles since most catalytic metals tend to be quite expensive. Because leadbased additives (i.e., tetraethyl lead) added to some gasolines can "poison" or destroy the usefulness of the catalyst, such additives have been effectively banned in the United States.

Although modern catalytic converters can be used to convert unburnt hydrocarbons and CO into carbon dioxide ($CO_2$) and water, they are generally only feasible for use with relatively clean burning systems such as gasoline-powered vehicles. They generally are not suitable for use with diesel engines. Because of the nature of diesel engines, both in terms of the fuel that is burned, as well as the way in which the fuel is burned, diesel engines produce substantial quantities of soot and other unburnt hydrocarbons which are too plentiful to be efficiently converted into $CO_2$ and water using reasonably sized and priced catalytic converters. Although they are known to generate substantial quantities of air-borne pollution, diesel engines have been largely exempted from the stringent air quality guidelines presently applied to gasoline-powered vehicles for largely economic reasons. Diesel engines are used for most long-haul shipping such as by tractor-trailers and trains and their elimination might cause dire economic problems. Nevertheless, researchers have struggled for years to find an effective and economical way to remove pollutants from the exhaust stream of diesel engines.

More recently, however, public concern has translated into increased political pressure to strengthen emission standards for diesel engines. There is a possibility that emission guidelines will be imposed in certain states that may be difficult, if not impossible, to meet in an economically feasible manner using conventional catalytic converters. The tendency of diesel engines to produce soot and other unburnt hydrocarbons at a rate that is many times that produced by gasoline-powered engines would require the use of far greater amounts of expensive catalyst using existing technology. However, one of the reasons why diesel engines have been exempted from air pollution standards in the first play is the tremendous cost that would be incurred in mandating the use of conventional catalytic converters to remediate the pollution caused by diesel engines.

Researchers have also struggled to find ways to effectively and economically address the tremendous quantity of pollutants generated by industrial burners, such as those that burn coal, fuel oil, or natural gas. In response to pollution controls directed to industrial burners, sophisticated scrubbers and after burners have been developed in attempts to satisfy such pollution standards. However, these and other pollution reduction means can be quite expensive, both in retrofitting older industrial burners as well as in the fabrication of new ones.

Finally, even assuming one could construct a perfectly effective catalytic converter for carbonaceous particulates, hydrocarbons and CO, the end result would still be the generation of equal or greater amounts of $CO_2$ compared to what is presently being generated. Although inert and non-polluting, $CO_2$ is still of concern to environmentalists due to the fear that the buildup of excessive amounts of $CO_2$ in the atmosphere has resulted in detectable global warming, although a minority of scientists remain skeptical, and will eventually result in catastrophic climatic changes if the world continues to generate $CO_2$ in high quantities. Since there does not appear to be any end in sight of the need to burn fossil fuels, the concentration of $CO_2$ will invariably continue to increase indefinitely.

In view of the foregoing, it would be an advancement in the art to provide methods and systems that could effectively and inexpensively eliminate, or at least substantially reduce, the quantity of unburnt or partially burnt combustion products produced by diesel engines and other internal combustion engines in an economically feasible manner.

It would be a further advancement in the art to provide methods and systems for eliminating, or at least greatly reducing, the quantity of incomplete combustion products produced by diesel engines, industrial burners, and other systems that burn fossil fuels which would eliminate the need for expensive catalysts, such as palladium, platinum and other rare and expensive metals.

It would yet be an advancement in the art if such methods and systems could be easily adapted, such as by upscaling or downscaling, in order to catalytically degrade waste combustion products produced by virtually any system that burned carbon-containing fuels, such as diesel trucks, trains, other vehicles, power plants, metal smelters, and virtually any industrial burner.

It would be an additional advancement if such methods and systems were able to reduce the quantity of $CO_2$ that is emitted into the atmosphere as a result of the burning of fossil fuels or other carbon-containing fuels.

Such methods and systems for catalytically destroying unburnt carbon particulates, soot, waste hydrocarbons, oily substances, CO and other pollutants produced by the incomplete combustion of carbon-containing fuels are disclosed and claimed herein.

SUMMARY AND OBJECTS OF THE INVENTION

The present invention relates to methods and systems for degrading and cleaning incomplete combustion products produced during the combustion of carbon-containing fuels. More particularly, the invention encompasses methods and systems that utilize a highly reactive environment generated by the complex interaction of a heated waste gas stream of incomplete combustion products, moisture, carbon dioxide, oxygen, and possibly other gaseous or fine particulate materials, with a bed of silica- or alumina-based catalytic media.

The highly reactive environment so generated has been found to be amazingly effective in eliminating at least a portion of carbon particulates, soot, hydrocarbons, CO, oily substances, and other unburnt organic materials produced during incomplete combustion of carbon-containing fuels. The inventive methods and systems are especially useful for the degradation of incomplete combustion products produced by diesel and other internal combustion engines and industrial burners, such as coal or fuel oil fired power plants, metal smelters and the like. Rather than using expensive catalysts such as those presently used to catalyze the conversion of soot, hydrocarbons and CO to $CO_2$ and water, the present invention utilizes particles such as silica which, under certain conditions, have been found to generate a highly reactive environment in the vicinity of the silica particles that is able to at least partially destroy many different kinds of incomplete combustion products. Silica particles, while conventionally believed to be entirely inert, are now believed to be capable of generating a localized region of highly reactive hydroxyl radicals and other highly reactive molecular fragments on their surface and within the vicinity of such particles under certain conditions to be discussed herein.

Although the technology of providing a fluidized bed of inert silica and alumina to assist in the pyrolysis or cracking of certain organic materials is well-known, it was heretofore unknown that such particles could also generate hydroxyl radicals under certain conditions. Instead, such particles were used mainly to better distribute heat throughout the fluidized bed and provide a scouring action in some cases. An example of a fluidized bed is found in European Patent Application Publication No. 0,176,123, filed Aug. 26, 1985, in the name of Geeroms (hereinafter "EU '123"), which discloses a "whirl bed" comprising a metal chamber, inert fluidizable particles such as silica, means for introducing heated gases through the fluidizable particles, and an afterburner for burning any gases that are formed by pyrolysis. The purpose for the whirl bed in EU '123 is to clean metal parts upon which paint, rubber, or other hard-to-remove substances have adhered. EU '123 appears to rely, however, on the combination of the abrasive action of the whirling sand media and a high temperatures (preferably 650° C. or above) to effect the pyrolytic and mechanical removal of the adhered organic substances to clean the metal parts.

While it is true that at temperatures high enough to effect pyrolysis silica and alumina appear to be entirely inert, it has heretofore not been understood that silica (and possibly alumina) are able, at temperatures ranging from as low as perhaps 30° C. up to perhaps 500° C., and in the presence of moisture, are apparently able to generate a localized, yet highly reactive, region or atmosphere containing highly reactive hydroxyl radicals and, perhaps, other highly reactive molecular fragments or moieties, that are able to at least partially degrade organic materials, including the incomplete combustion products of carbon-containing fuels. In particular, the inventors of the present technology have discovered that an abundance of very reactive hydroxyl radicals and other reactive hydrogen oxide species (and possibly other oxide or oxidizing species) can apparently be generated by silica and alumina under certain conditions and which are capable of destroying soot, unburnt hydrocarbons, CO and other incomplete combustion products at temperatures far below their respective combustion temperatures. Such pollutants are not being destroyed by combustion but by the highly reactive hydroxyl radicals and other reactive species believed to be generated by the interaction between moisture and silica or alumina particles in a surface phenomenon.

In a preferred embodiment, the silica and/or alumina particles are suspended or fluidized in a fairly static condition against the force of gravity by means of air flowing upwards through the particles. Such airflow can be provided by any gas pressurizing means known in the art, including turbines, fans, pumps, the inherent pressure generated by internal combustion engines, and combinations of the foregoing. Suspending or fluidizing the particles greatly increases the active surface area of the silica and/or alumina particles by separating them slightly and allowing for more gas-to-particle contact.

As stated above, it now appears that hydroxyl radicals can be generated at relatively low temperatures, perhaps as low as about 30° C., up to about 500° C. The reaction chamber is preferably heated and maintained at temperatures in a range of about 50° C. to about 400° C., more preferably in a range of about 75° C. to about 350° C., and most preferably in a range of about 100° C. to about 300° C. Such temperatures are preferred in view of their being generally within the temperature range of exhaust gases generated by internal combustion engines after passing through the exhaust system. Although such temperatures are preferred, the degradation of soot, hydrocarbons, CO and other incomplete combustion products of carbon-containing fuels by means of hydroxyl radicals and other reactive species generated by silica, alumina and the like at any temperature would be within the scope of the invention.

The heat necessary to maintain the reaction chamber within the desired temperature range can be provided by any source. In a preferred embodiment, the heat will be provided substantially, or even exclusively, by the exhaust gases themselves. Nevertheless, it is certainly within the scope of the invention to supplement the heat found in exhaust gases by means of electric heaters, burning fuels such as methane gas, by recycling heat recovered from other sources, or by any other heat source that is able to provide a desired quantity of heat in order to maintain the reaction chamber within a desired temperature range. For example, at initial startup of a diesel engine, or after extensive idling or downhill travel, the exhaust gases generated by the diesel engine may be too cold to adequately heat the reaction chamber. In such cases it may be desirable to provide supplemental heating in order to raise and then maintain the temperature in order to ensure efficient degradation of soot, hydrocarbons and other incomplete combustion products.

Providing an oxygen-rich environment would be expected to increase the oxidative breakdown of the organic wastes, although breakdown has been observed in an oxygen-poor environment within the reaction chamber so long as the media particles have been exposed to some degree of moisture. The apparatus may optionally include means for introducing a variety of gases within the reaction chamber, such water vapor, oxygen, ammonia, etc. One such means for introducing gases is the diffusion pipe or pipes used to introduce the incomplete combustion products into the reaction chamber. Another might be a separate port feeding into the reaction chamber.

In a preferred embodiment, the means for suspending the media, maintaining the temperature at the desired level, introducing exhaust gases to be treated, and optionally introducing oxygen and water vapor rich gas into the reaction chamber comprise one or more diffusion pipes containing spaced-apart diffusion holes submerged beneath a bed of silica or alumina. In many cases it will not be necessary to enrich the reaction chamber with water vapor since exhaust gases typically contain abundant water vapor as a result of the combustion of the hydrogen portion of hydrocarbon fuels. Sensors can be placed within the reaction chamber in order to regulate the inputs of water vapor, oxygen, heat, etc.

Because of the extremely simple apparatus used to carry out the reaction process, it is possible to greatly upscale or downscale the reaction apparatus size to accommodate a wide variety of uses and applications. The reaction chambers may be very large or utilized in series in order to serve large industrial needs such as coal or petroleum fired power plants, smelters and the like. Alternatively, they may be downsized and adapted for use in catalytically treating exhaust gases produced by internal combustion engines, e.g. diesel-, gasoline-, and propane-powered engines.

Exhaust gases from the burning of carbon-containing fuels typically comprises incomplete combustion products, which may include carbon soot, gaseous, liquid or particulate hydrocarbons, carbon monoxide, and diatomic hydrogen, among other compounds. Actual laboratory testing has shown that passing exhaust gases produced by a diesel engine through a reaction chamber containing fluidized silica particles greatly reduces both the level of soot produced by the combustion of diesel fuel as well as carbon monoxide.

Although such pollutants would be expected be converted into $CO_2$ or a mixture of $CO_2$ and water, one of the startling discoveries has been a dramatic decrease in the concentration of $CO_2$ in the exhaust stream after being passed through the reaction chamber, as well as a dramatic increase in the oxygen content. Although not entirely understand, it may be that the carbon monoxide and/or carbon dioxide may actually react with silica to yield silicon carbide, together with the concomitant release of oxygen. In addition, nitrogen oxides (NOx) have apparently been reduced by about 90%, presumably to nitrogen gas, or possibly even to silicon nitride in a modified, catalyzed carbothermal reaction that may involve one or more of particulate carbon, hydrocarbons, CO or $CO_2$. The inventors have not ruled out other possible reaction sequences that seem to be consuming the $CO_2$. Finally, it is believed that the methods and systems are able to at least partially eliminate sulfer dioxide.

In view of the foregoing, it is an object to provide methods and systems that effectively and inexpensively eliminate, or at least substantially reduce, the quantity of unburnt or partially burnt combustion products produced by diesel engines and other internal combustion engines in an economically feasible manner.

It is a further object to provide methods and systems for eliminating, or at least greatly reducing, the quantity of incomplete combustion products produced by diesel engines, industrial burners, and other systems that burn fossil fuels, thereby eliminating the need for expensive catalysts, such as palladium, platinum and other rare and expensive metals.

It is yet an object to provide methods and systems that can be easily adapted, such as by upscaling or downscaling, in order to catalytically degrade waste combustion products produced by virtually any system that burned carbon-containing fuels, such as diesel trucks, trains, other vehicles, power plants, metal smelters, and virtually any industrial burner.

It is an additional object and feature to provide methods and systems that are able to reduce the quantity of $CO_2$ that is emitted into the atmosphere as a result of the burning of fossil fuels or other carbon-containing fuels.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity in detail to the use of the accompanying drawings in which.

DETAILED DESCRIPTION OF THE PREFERRED EMBODIMENTS

Figure 1:
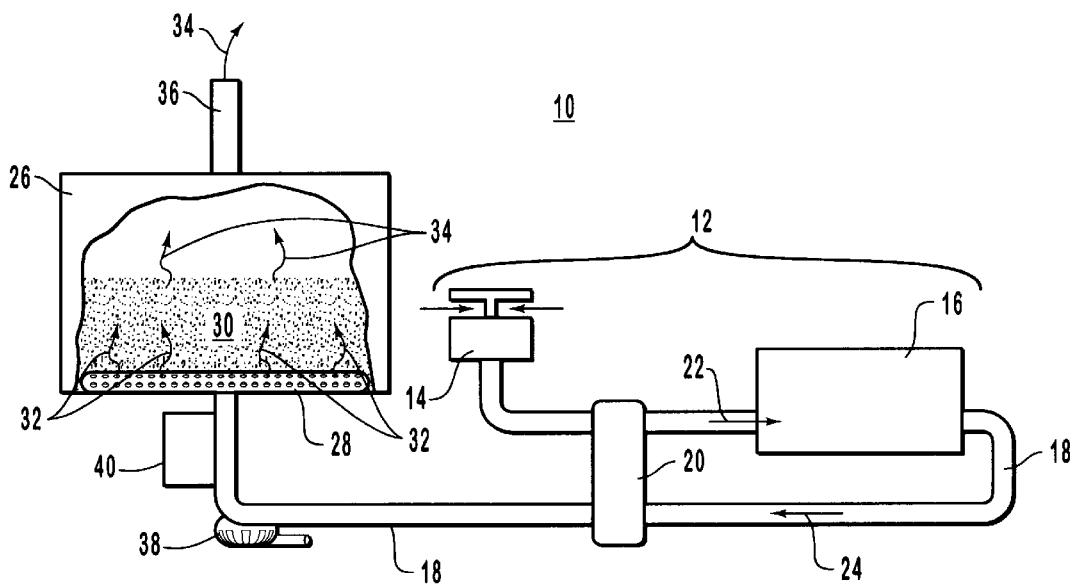
FIG. 1 is a cross-section view of an exemplary reaction chamber used in combination with a diesel engine for cleaning incomplete combustion products formed by the combustion of diesel fuel.

The present invention relates to methods and systems for degrading and at least partially eliminating incomplete combustion products produced by the burning of carbon-containing fuels. The methods and systems are believed to generate hydroxyl radicals, and possibly other highly reactive molecular fragments or species that are able to degrade said incomplete combustion products. Such methods and systems may be used, for example, in the degradation of incomplete combustion products produced by internal combustion engines, such as diesel engines, and industrial burners, such as power plants, metallurgical smelters and the like. Moreover, the methods and systems have yielded the surprising and counterintuitive result of actually reducing the output of carbon dioxide, while apparently also increasing the content of oxygen in the exhaust stream.

Carbon-containing fuels, when not completely oxidized during combustion, can yield finely divided carbon particles (soot), unburnt hydrocarbons, carbon monoxide, hydrogen gas, and the like. Whereas U.S. Pat. No. 5,676,070 discloses methods and systems that may be used in disinfecting and catalytically oxidizing organic waste materials such as medical wastes and corpses, it was not known at that time that such methods and systems could be used in modified form to degrade and at least partially eliminate unburnt organic particulates and gases found in diesel exhaust, flue exhaust from industrial burners, and other incomplete combustion products from the burning of fossil fuels and other carbon-containing fuels. For purposes of generally teaching methods and systems used in the catalytic oxidation of organic waste materials, the foregoing patent is incorporated herein by specific reference.

In a preferred embodiment, the invention relates to improved methods and systems for degrading and cleaning incomplete combustion products found in exhaust that is generated by the burning of fossil fuels by internal combustion engines and industrial burners. In a most preferred embodiment, such methods and systems are especially useful in treating the incomplete combustion products produced by diesel engines. The incomplete combustion products (usually together with the entire exhaust stream) is passed through a reaction chamber containing a bed or layer of silica and/or alumina particles. Such particles are preferably in a suspended or fluidized state as result of the input of waste exhaust gases. Through mechanisms which are not entirely understood it has been found that a fluidized bed of silica, without any special catalysts added thereto, is somehow able to destroy the vast majority of carbonaceous soot, unburnt hydrocarbons and carbon monoxide found in the exhaust stream. Alumina is also believed to work in degrading and cleaning incomplete combustion products, although silica is preferred.

The terms "degrade" or "degradation", as used in the specification and the appended claims, refer to the breakdown of larger organic molecules within the organic waste material into smaller organic molecules, mainly through the catalytic cleavage of carbon-carbon bonds. These terms shall also refer to the cleavage of any other molecular bonds during the process of gasifying and oxidizing. The terms also include the complete oxidation of organic gases or particulates into carbon dioxide, water, and/or other oxidation products. It also includes any reaction in which CO, $CO_2$, carbon or hydrocarbons are converted into other, less polluting forms of carbon.

In some respects, the terms "clean" and "cleaning" may be synonymous with the terms "degrade" or "degradation" but shall also include any process by which a more pollution substance is converted into a less polluting product. Thus, "clean" and "cleaning" shall refer to the reduction of unburnt hydrocarbons, particulate carbon, soot, oily substances, and like, as well as any conversion of gases such as CO, $CO_2$, $NO_x$ and $SO_2$ into less polluting substances. While $CO_2$ is not a "pollutant" in the same manner as CO, $NO_x$, $SO_2$ and incomplete combustion products of carbon-containing fuels, it is believed to be a green house gas that may contribute to global warming. Thus, any reduction in the concentration of $CO_2$ in an exhaust stream, whether or not oxygen is produced, shall constitute "cleaning".

The term "degrading atmosphere" shall refer to the condition within the reaction chamber, and surrounding areas and conduits, that include a localized concentration of highly reactive hydroxyl radicals and/or other reactive molecular fragments, free radicals or species capable of degrading and cleaning a waste exhaust stream generated by the burning of a carbon-containing fuel.

The terms "activate" and "activated" shall refer a condition in which silica and/or alumina particles are able to produce a "degrading atmosphere" capable of degrading and cleaning a waste exhaust stream generated by the burning of a carbon-containing fuel. "Activation" of silica has been shown to occur at various temperatures below about 500° C., and as low as about 30° C., in the presence of waste exhaust gases produced by the combustion of diesel fuel in an internal combustion engine.

The term "incomplete combustion products", as used in the specification and the appended claims, shall refer to incompletely oxidized reaction products that are formed during combustion or other rapid or incomplete oxidation processes involving carbon-containing fuels. The incomplete combustion products may consist of, for example, gases, solid particulates, liquids, or mixtures thereof. Incomplete combustion products typically include carbon soot, unburnt hydrocarbons, whether in particulate or in vaporous form, carbon monoxide, hydrogen gas, and the like. The term "carbon soot" is a subset of the term "incomplete combustion products" and includes unburnt and residual carbonaceous and hydrocarbon particulates.

The term "carbon-containing fuel" shall be understood to refer to any organic material that may be combusted or burned in order to generate or release energy, usually in the form of heat, light or a combination thereof. The term "fossil fuel" is a subset of "carbon-containing fuel" and includes coal, oil, natural gas, derivatives of coal, natural gas and oil, and the like. Non-fossil fuels include alcohols, fuels derived from alcohols or other fermentation products, wood, biomass and the like.

The term "operating temperature" shall refer to any temperature at which hydroxyl radicals and/or other free radicals, molecular fragments or reactive species capable of cleaning an exhaust stream generated by the combustion of a carbon-containing fuel are generated by silica and/or alumina. It is presently believed that the operating temperature may range from as low as about 30° C. to as high as perhaps about 500° C.

The term "reaction chamber" shall be broadly construed to include any apparatus capable of holding therein silica and/or alumina and that provides appropriate conditions that result in formation of the degrading atmosphere of hydroxyl radicals or other reactive fragments or species.

The terms "interact" and "interacting," in the context of the formation of hydroxyl radicals through the interaction of water and silica or alumina, shall include any chemical reaction, including surface reactions between water and silica or alumina, by which hydroxyl radicals are generated within the operating temperature.

The terms "interact" and "interacting," in the context of the degradation or cleaning of waste exhaust gases by means of hydroxyl radicals, shall include any chemical reaction by which polluting components such as soot, hydrocarbons, CO, and oily substances are at least partially broken down or eliminated to yield less polluting substances. It shall also refer to chemical reactions that involve the elimination or transformation of carbon dioxide into other carbon-containing compounds or substances.

II. SYSTEMS AND METHODS FOR CLEANING EXHAUST GASES

Reference is now made to FIG. 1, which illustrates an exemplary embodiment of a cleaning system 10 adapted for use in treating the incomplete combustion products produced by an internal combustion engine. The internal combustion engine may be a diesel engine 12, or may alternatively be other internal combustion engines or other devices that burn fossil fuels. Cleaning system 10 functions to degrade and clean the incomplete combustion products of an internal combustion engine into non or less polluting forms. In some ways the process is similar to those provided by conventional catalytic converters, but without the need for expensive metallic catalysts, such as palladium, platinum and the like.

A typical diesel engine 12 comprises an air intake 14, a combustion chamber 16, and an exhaust channel 18. A turbocharger 20 is configured to compress an intake air/fuel mixture 22 that is fed into the combustion chamber 16 in order to increase the efficiency of the diesel engine 12 by supplying more combustion air initially. The turbocharger is often configured to communicate with the exhaust channel 18, with the flow of exhaust gases providing force for driving the turbocharger.

Waste exhaust products 24 are discharged from the combustion chamber 16 into the exhaust channel 18. In FIG. 1, the exhaust channel 18 is depicted as providing an uninterrupted conduit that directs the waste exhaust products 24 into a reaction chamber 26. However, any appropriate means for introducing the waste exhaust products 24 into the reaction chamber 26 may be employed. The majority of waste exhaust products 24 typically consist of inert nitrogen gas, carbon dioxide, water, and some oxygen gas. However, due to non-ideal air/fuel ratios, incomplete mixing, inefficiencies inherent during acceleration, or other reasons, some of the diesel fuel used in diesel engine 12 may not be completely burned into $CO_2$ and water. As a result, incomplete combustion products, most notably carbon soot, unburnt particulate, oily and gaseous hydrocarbons, and carbon monoxide are produced in significant quantities by the diesel engine 12. Such incomplete combustion products are often visible, particularly during the acceleration phase of a diesel powered vehicle when combustion is least efficient.

The waste exhaust products 24 are introduced into the reaction chamber 26 by means of one or more diffusion pipes 28. The diffusion pipe 28 includes a plurality of holes or passages distributed therethrough which allows for a desired distribution pattern of the waste exhaust products 24 throughout the reaction chamber 26. The waste exhaust products 24 are more particularly diffused throughout catalytically reactive particles 30 located within the reaction chamber 26 as diffused exhaust gases 32. The catalytically reactive particles 30 consist essentially of silica, alumina, or mixtures thereof. The term "consist essentially of" should be understood to mean that the catalytically reactive particles mainly consist of silica, alumina or mixtures thereof, but they may include minor quantities of impurities such as metals and ash typically found in silica and/or alumina. It is believed that the silica and/or alumina, when properly activated in the presence of sufficient heat and moisture, produce a localized degrading atmosphere of highly reactive hydroxyl radicals, and possibly other reactive species or molecular fragments, that are able to degrade and clean a variety of pollutants found in a waste exhaust stream generated by the burning of carbon-containing fuels. Moreover, whereas the silica and/or alumina are believed to be responsible for the formation of a degrading atmosphere that includes abundant hydroxyl radicals such that expensive catalysts such as palladium and platinum are not necessary, inclusion of such materials in minor amounts would be within the scope of the present invention so long as the silica and/or alumina are "activated" and able to produce the degrading atmosphere.

In a preferred embodiment the catalytically reactive particles 30 are "fluidized," as that term is understood in the art, meaning that at least a portion of the particles are elevated and/or slightly separated by rising gases such that they are not in a state of natural particle packing density. Fluidizing or elevating the particles leaves them in a much less compacted state. This fluidized, separated or elevated state yields particles having a surface area that is more accessible and available for contact with the diffused exhaust gases 32 rising through the particles 30. Increased surface contact with the diffused exhaust gases 32 is believed to increase the ability of the reactive particles 30 to generate the degrading atmosphere of hydroxyl radicals. As the exhaust gases 32 are treated by the degrading atmosphere so as to degrade or clean pollutants contained therein, the exhaust gases 32 become treated exhaust gases 34. The treated exhaust gases 34 exit the reaction chamber 26 by means of an outlet or stack 36.

As stated above, it is preferable for the catalytically reactive particles 30 to be in a fluidized or suspended state in order to increase their available surface area and ability to catalytically react with the diffused exhaust gases 32. In some cases, the waste exhaust products 24 themselves will have sufficient pressure to cause the catalytically reactive particles 30 to become fluidized, separated, or otherwise partially suspended. However, in the case where the waste exhaust products 24 have insufficient pressure to cause adequate fluidization or levitation of the catalytically reactive particles 30, it may be necessary, or at least preferable, to increase the pressure of the waste exhaust products 24 prior to their being introduced into the reaction chamber 26. This may be done by means of a compressor 38 or other compressing means known in the art. In many cases the pressure of the waste exhaust products 24 will depend on the rate at which the diesel engine is consuming diesel fuel and will typically correspond to the number of RPMs at which the engine is running. At higher RPMs the exhaust gases will typically have adequate pressure to cause at least partial fluidization of the catalytically reactive particles 30. However, at lower RPMs the waste exhaust products 24 may require assistance by means of the aforementioned compressor 38.

An information feed-back mechanism (not shown) may be utilized to determine whether or not the compressor 38 needs to be activated at any particular point in time as well as the degree of pressurization to be imparted to the waste exhaust products 24. One of ordinary skill in the art will be able to adjust the amount of compression imparted by the compressor 38 depending on the requirements of the overall cleaning system 10.

Waste exhaust products 24 typically leave the diesel engine 12 at temperatures of about 400° C. to about 550° C. However, the waste exhaust products 24 typically begin to cool after leaving the diesel engine 12 and after passing through the exhaust channel 18. In order to preserve generated by the diesel engine 12, it may be desirable to position the reaction chamber 26 in relation to the diesel engine 12 so that the waste exhaust products 24 do not cool to temperatures below the preferred operating temperature of the cleaning system 10. In addition, various insulating means known in the art may be utilized in order to preserve a desired amount of the heat produced by burning fuel within the diesel engine 12 and found within the waste exhaust products 24 as they leave combustion chamber 16.

In the event that it is desired to increase the temperature of the waste exhaust products 24, it may be desirable to utilize an auxiliary heater 40 in order to increase the temperature of the waste exhaust products 24 prior to their entering into the reaction chamber 26. In addition, the auxiliary heater 40 may optionally be configured so as to provide moisture as needed to maintain the reactivity of the catalytically reactive particles. Nevertheless, the waste exhaust products 24 will themselves generally provide adequate moisture in the form of combustion water produced by the oxidation of hydrocarbons.

In alternative embodiments, the fluidization of the catalytically reactive particles 30 maybe carried out by means of an auxiliary input system (see FIG. 3, items numbers 104, 120) which act independently of the force of the waste exhaust products 24 being introduced into the reaction chamber 26 through the diffusion pipe(s) 28. In addition, auxiliary heating means (see FIG. 3, item number 88) located within the reaction chamber 26 may be used in order to maintain the reaction chamber 26 at a desired operating temperature, particularly at start up when the diesel engine is cold and the waste exhaust products 24 are too low to maintain the reaction chamber 26 at the desired temperature. Finally, in the event that the waste exhaust gases are too hot such that their temperature is higher than the desired operating temperature of the reaction chamber 26, it may be necessary to provide cooling means (not shown) in order to maintain the waste exhaust products 24 at a desired temperature.

In general, it is currently believed that the "operating temperature" (i.e., the temperature at which the catalytic particles are able to produce a degrading atmosphere of highly reactive hydroxyl radicals and other reactive species) may be as low as about 30° C. and as high as about 500° C., preferably in a range of about 50° C. to about 400° C., more preferably in a range of about 75° C. to about 350° C., and most preferably in a range of about 100° C. to about 300° C.

It may be advantageous to select catalytic reactive particles 30 that have a relatively high specific surface area. It is believed that it is at the surface of the reactive particles 30 where the reactive hydroxyl radicals or other reactive species or molecular fragments are generated. Accordingly, increasing the surface area of the particles 30 without increasing their weight allows for the use of a lower mass of reactive particles 30 while maintaining a desired level of reactivity of the cleaning system 10. Reduced weight is particularly desirable in the present embodiment, since reaction chamber 26 is typically installed in and carried by a diesel-powered vehicle. The amount of silica and/or alumina particles 30 that are needed maybe significantly reduced when the grain size is reduced and/or the surface of the particles 30 is made to be more irregular, both of which tend to increase the specific surface area of the particles.

It should also be appreciated that reducing the amount of silica or other reactive particles may reduce the percentage of carbon soot and other incomplete combustion products that are removed from waste exhaust products 24. Thus, the preferred amount of silica and/or alumina is determined by a trade-off involving the weight of the cleaning system 10 on the one hand, and the extent to which one wishes to catalytically degrade and clean the waste exhaust products 24, on the other.

Figure 2:
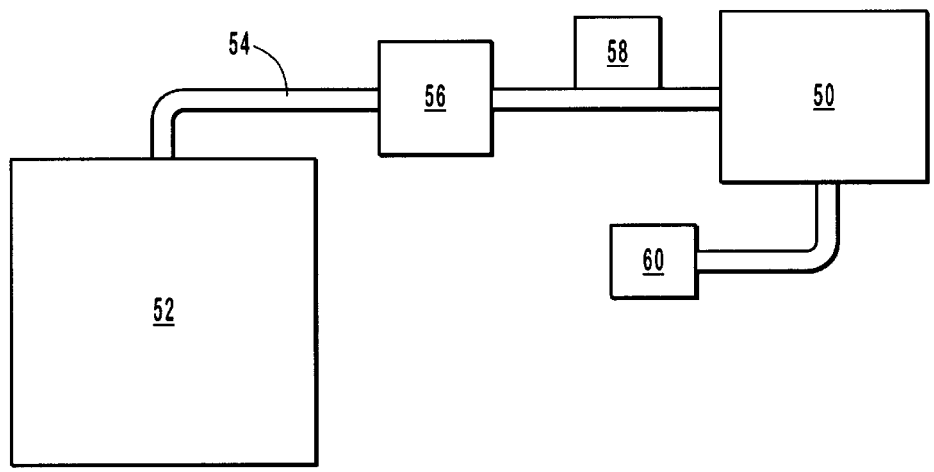
FIG. 2 is a schematic view of a reaction chamber used in combination with an exhaust flue of an industrial burner.

The catalytic systems according to the present invention can be modified, such as by upscaling or downscaling, to degrade and clean virtually any waste exhaust stream that includes incomplete combustion products of a carbon-containing fuel. For example, FIG. 2 is a schematic diagram depicting a reaction chamber 50 upsized and configured for use in degrading and cleaning incomplete combustion products produced by an industrial burner 52. Such industrial burners 52 commonly burn coal, coke, fuel oil, natural gas, or derivatives of coal, petroleum or natural gas, all of which are capable of generating incomplete combustion products such as soot, unburnt or partially burnt hydrocarbons, and carbon monoxide. Industrial burners 52 are utilized in a wide range of industrial operations, such a power generation, metal smelting, manufacturing, and the like.

Exhaust gases produced by the industrial burner 52 are carried from the burner 52 to the reaction chamber 50 by means of an exhaust conduit or channel 54. A compressor 56 may be used to ensure that the exhaust gases produced by the industrial burner 52 are fed into reaction chamber 50 with adequate pressure. An in-line introducer of auxiliary inputs 58 may be used in order to ensure adequate heat and/or moisture content of the exhaust gases before they are introduced into the reaction chamber 50. In addition, or alternatively, heat and/or moisture may be introduced by means of an off-line or parallel introducer of auxiliary inputs 60 connected separately to the reaction chamber 50. Introducer 60 may also be used to independently fluidize, separate, or at least partially suspend the catalytically reactive particles of silica or alumina located within the reaction chamber 50.

Figure 3:
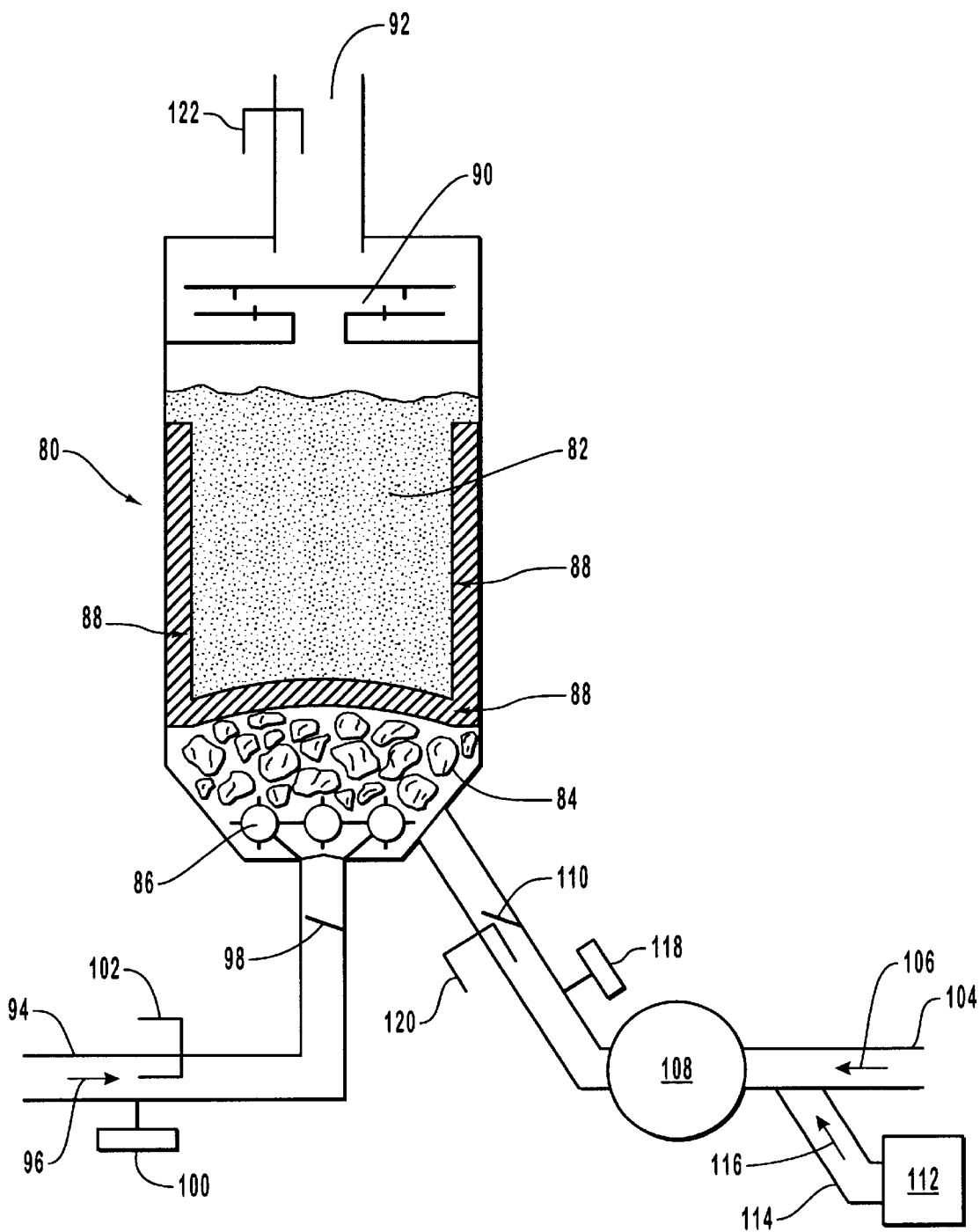
FIG. 3 is a cross-section view of an alternative embodiment of a reactive chamber according to the invention.

In order to illustrate another embodiment of a cleaning system according to the present invention, reference is now made to FIG. 3. Depicted therein is a reaction chamber 80 that includes therein catalytically reactive particles 82 comprising silica, alumina or a combination thereof. The bed of catalytically reactive particles 82 sits atop a bed of rocks 84 surrounding porous introduction tubes 86 in order to more evenly distribute waste exhaust gases emitted by the porous diffusion tubes 86 and into the catalytically reactive particles 82. An optional auxiliary heating element 88 that provides resistive heat is shown disposed around the inner circumference of the reaction chamber 80 in order to provide additional heat if needed during operation of the reaction chamber 80. Exhaust gases 96 that have been treated by reaction chamber 80 are preferably removed from the reaction chamber 80 by passing them through a cyclone filter 90 and out an exhaust stack 92.

Exhaust gases 96 are introduced into the reaction chamber 80 by means of an exhaust channel 94 communicating between reaction chamber 80 and an internal combustion engine (not shown), such as a diesel engine or some other source of waste gases, such as an industrial burner. The exhaust channel 94 may further be equipped with an anti-backflow trap 98 in order to ensure essentially one-way flow of exhaust gases 96 into the reaction chamber 80. The exhaust channel 94 may optionally be equipped with a pressure tube 100 for measuring the pressure of the exhaust gases 96. A Pitot tube 102 may also be employed to measure the velocity of the exhaust gases 96.

In order to assist the exhaust gases 96 in heating, and/or fluidizing the catalytically reactive particles 82 within the reaction chamber 80, an auxiliary air input system may be employed. Such an auxiliary input system preferably includes an air input channel 104 through which air 106 canbe introduced into the reaction chamber 80. The air is compressed and accelerated by means of an air turbine 108. An anti-backflow trap 110 may be used to ensure one-way flow of air 106 into the reaction chamber 80 and in order to prevent unwanted escape of exhaust gases 96 through the air input channel 104.

A heating unit 112 may also be employed for introducing heated air into air input channel 104. A heated air channel 114 communicating between the heating unit 112 and air input channel 104 directs heated air 116 into air channel 104. An optional pressure tube 118 maybe used to measure pressure, while an auxiliary Pitot tube 120 may be used to measure the velocity, of the air 106 being input into the reaction chamber 80. Finally, a Pitot tube 122 may be used within the exhaust stack 92 in order to measure the velocity of the treated exhaust gases exiting the exhaust stack 92.

Figure 4:
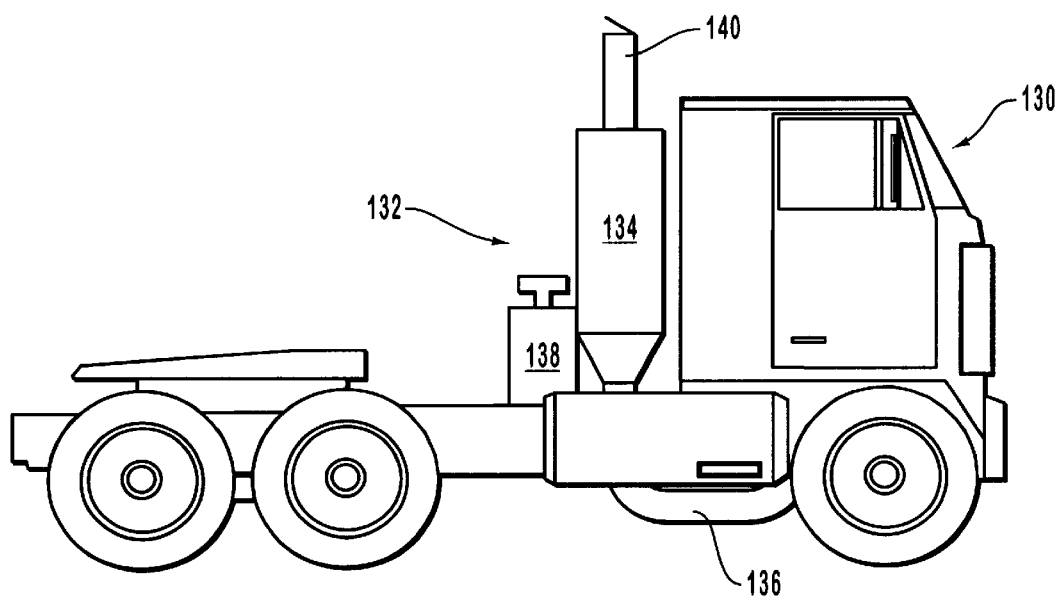
FIG. 4 is a partial cross-section view of a reaction chamber sized and configured for use with a diesel-powered tractor-trailer rig.

FIG. 4 depicts a diesel tractor trailer 130 equipped with a catalytic system 132, more particularly a reaction chamber 134, sized and configured for convenient use with the tractor-trailer 130. Exhaust gases from the tractor-trailer are introduced into the reaction chamber 134 by means of an exhaust channel 136. A turbine 138 may be used to introduce additional air into the reaction chamber 134 in order to provide adequate fluidization of catalytically reactive particles located therein. In addition, or alternatively, the turbine 138 may be used to increase the pressure of the exhaust gases themselves before being introduced into the reaction chamber 134. The treated exhaust gases are expelled from the reaction chamber 134 through an exhaust stack 140.

Figure 5:
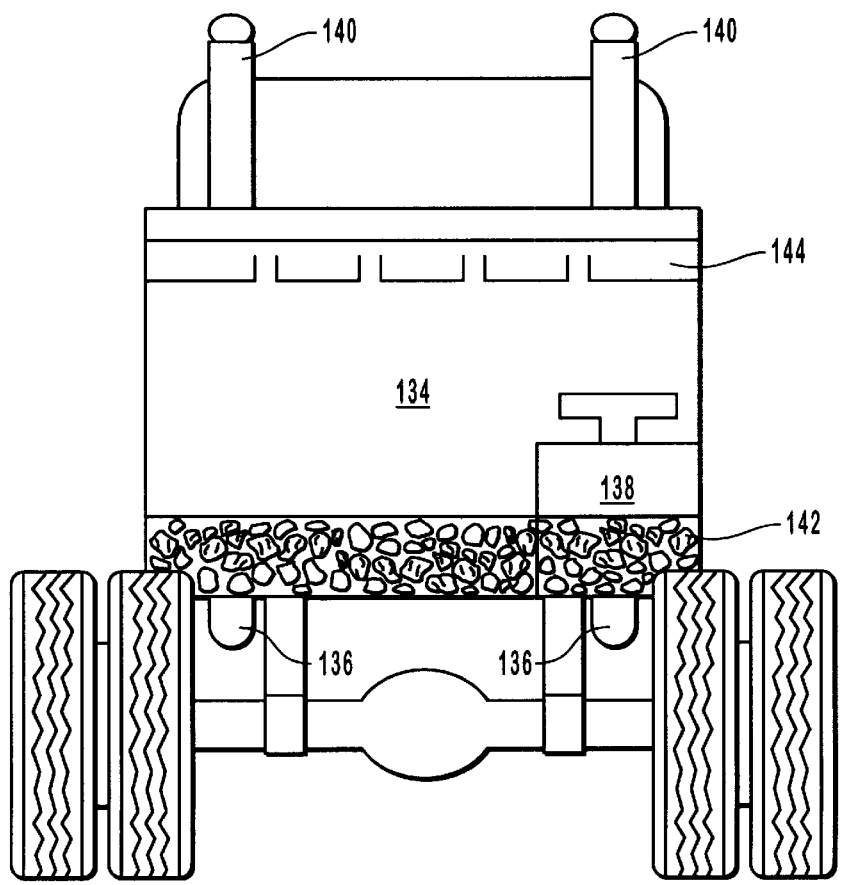
FIG. 5 is a rear cross-section view of a reaction chamber configured to approximate the width of a diesel-powered tractor-trailer rig.

FIG. 5 is a rear view of the catalytic system 132 depicted in FIG. 4 showing that the reaction chamber 134 can occupy substantially the entire width of the tractor trailer 130. FIG. 5 further depicts a bed of rocks 142 used to assist the distribution of waste exhaust gases throughout the reaction chamber 134, as well as cyclone filters 144 through which the treated exhaust gases pass before escaping through the exhaust stacks 140.

Figure 6:
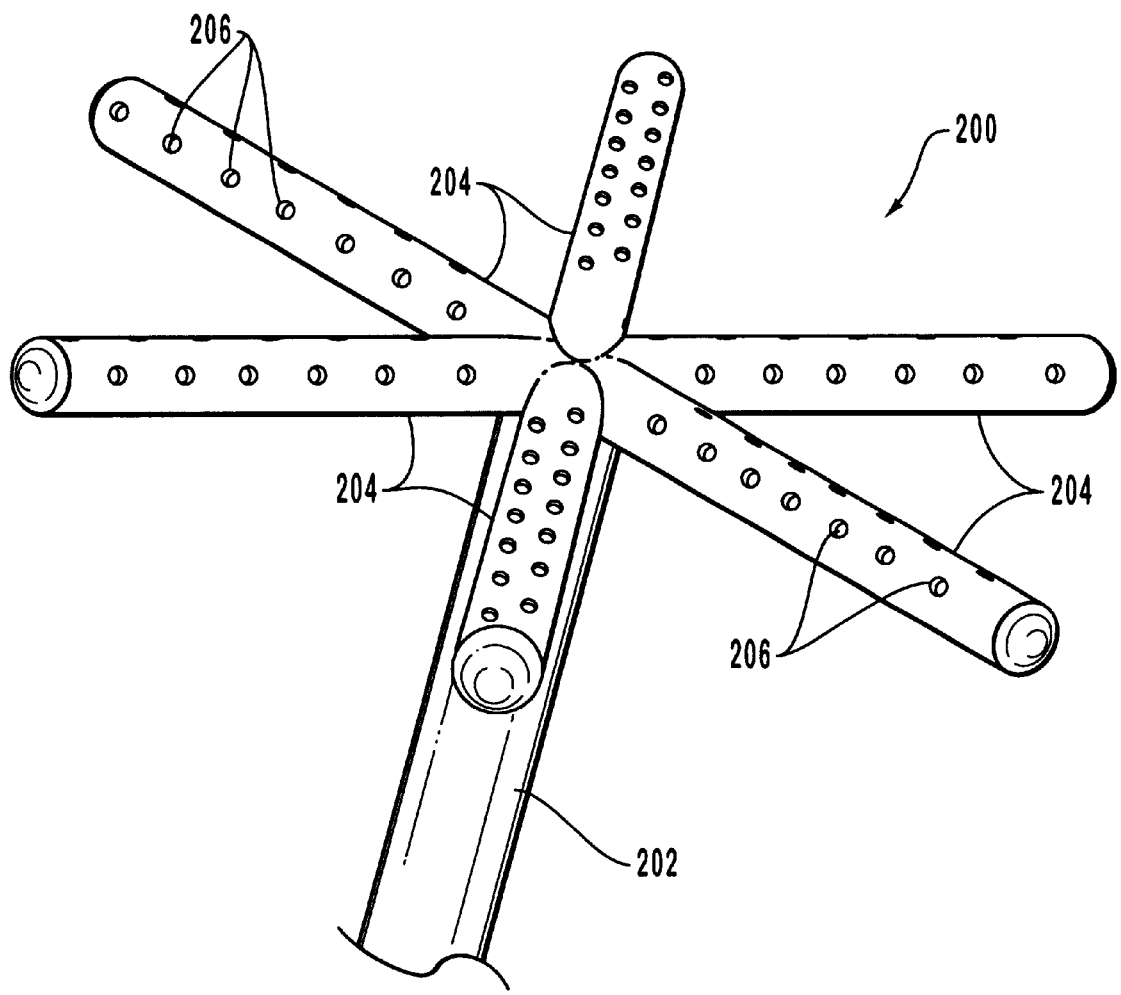
FIG. 6 is a perspective view of a radial diffusion pipe for inputting waste exhaust gases into a reaction chamber according to the invention.
Figure 7:
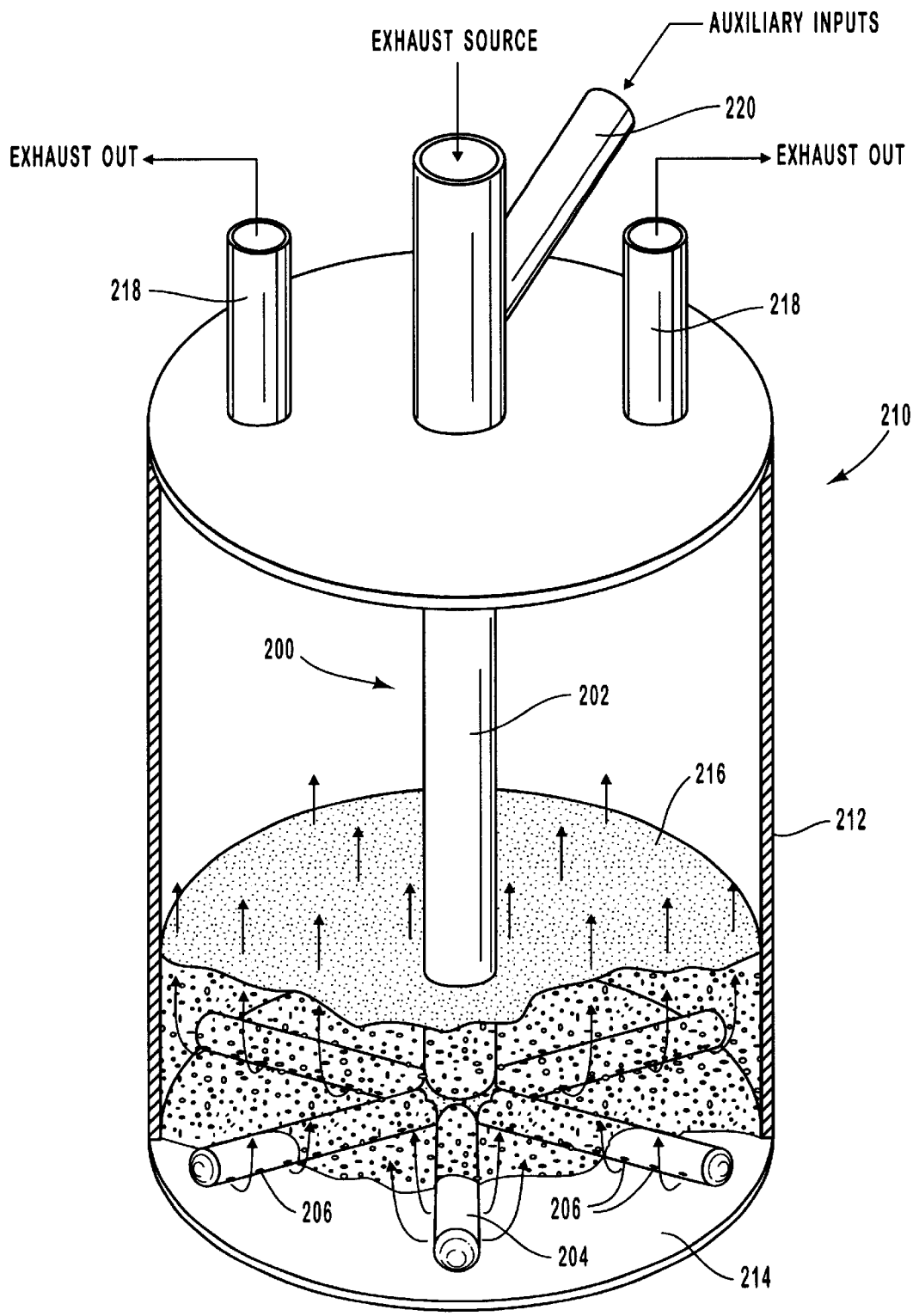
FIG. 7 is cut-away perspective view of the radial diffusion pipe of FIG. 6 within a reaction chamber according to the invention.

FIG. 6 depicts a diffusion system 200 according to the present invention that may be used to diffuse waste exhaust gases generated by an internal combustion car engine within an appropriately sized and shaped reaction chamber (FIG. 7). For cars, smaller trucks and similarly-sized vehicles, the diffusion system 200 is the preferred means for introducing waste exhaust gases into the cleaning systems according to the present invention.

The diffusion system 200 more particularly includes a central pipe 202 in gaseous communication with an internal combustion engine. A plurality of diffusion tubes 204 in gaseous communication with the central pipe 202 distribute the gases evenly throughout the muffling/catalytic system, more particularly by means of diffusion holes 206. In the case where the inner base or bottom of the reaction chamber is planar, the diffusion tubes 204 are advantageously oriented perpendicular to the central pipe 202 and radiate in a spoke-like fashion in order to best diffuse the gases through the bed of reactive particles. In the case where the bottom of the reaction chamber is angled (e.g., a cone) or curved (e.g., in the form of a curved basin), the diffusion tubes 204 may advantageously conform to the shape of the reaction chamber bottom.

In one actual working embodiment, the central pipe 202 had an inner diameter of 2 inches, the diffusion tubes 204 had an inner diameter of 1 inch, and the diffusion holes had a diameter of between 0.097 and 0.100 inch. The central pipe 202 was 5 feet long, and each diffusion tube 204 extended 7 inches from the central pipe 202. Each diffusion tube 204 included 7 pairs of holes located on either side of the bottom of each tube 204, with each pair of holes being separated by a radial distance of about 80° (ie., each hole is offset from a central point (e.g., the bottom of the pipe when in use) by a radial distance of about 40°. The central pipe 202 and diffusion tubes 204 were made of iron.

FIG. 7 depicts a cleaning system 210 according to the invention, which includes a cylindrical reaction chamber 212 in combination with diffusion system 200. The reaction chamber 212 includes a substantially flat bottom 214 which supports a bed of silica or alumina particles 216. The diffusion tubes 204 are preferably buried beneath or otherwise surrounded by the bed of reactive particles 216 when in use. The exhaust gases enter the reaction chamber 212 through diffusion holes 206, rise up through the bed of reactive particles 216, and exit the reaction chamber 212 through exit conduits 218. Auxiliary inputs, such as moisture, heat, oxygen and the like, may be input into the reaction chamber 212 through auxiliary input channel 220.

In order to maximize the ability of the waste exhaust gases to contact and at least partially elevate or suspend the reactive particles during operation of the reaction chamber, the diffusion holes 206 will preferably be oriented so as direct the gases toward the bottom of the reaction chamber. Thus, the diffusion holes 206 will advantageously be oriented on or within the underside of each diffusion tube 204.

In addition to cleaning the waste exhaust stream, the surrounding particles 216 may also act to efficiently dampen sounds and sound waves contained within a stream of exhaust gases from an internal combustion engine, e.g., a diesel engine, and are able to do so while maintaining substantially lower back pressure compared to conventional muffling systems. Although some back pressure is often desirable, reducing the back pressure within the exhaust system will typically increase both fuel efficiency and power.

In order to prevent backflow of the silica or other particles within the reaction chamber into the exhaust system, the diffusion system 200 will advantageously feed the waste exhaust gases through the top of the reaction chamber, or at least at some point that is higher than the level of the silica particles.

Figure 8:
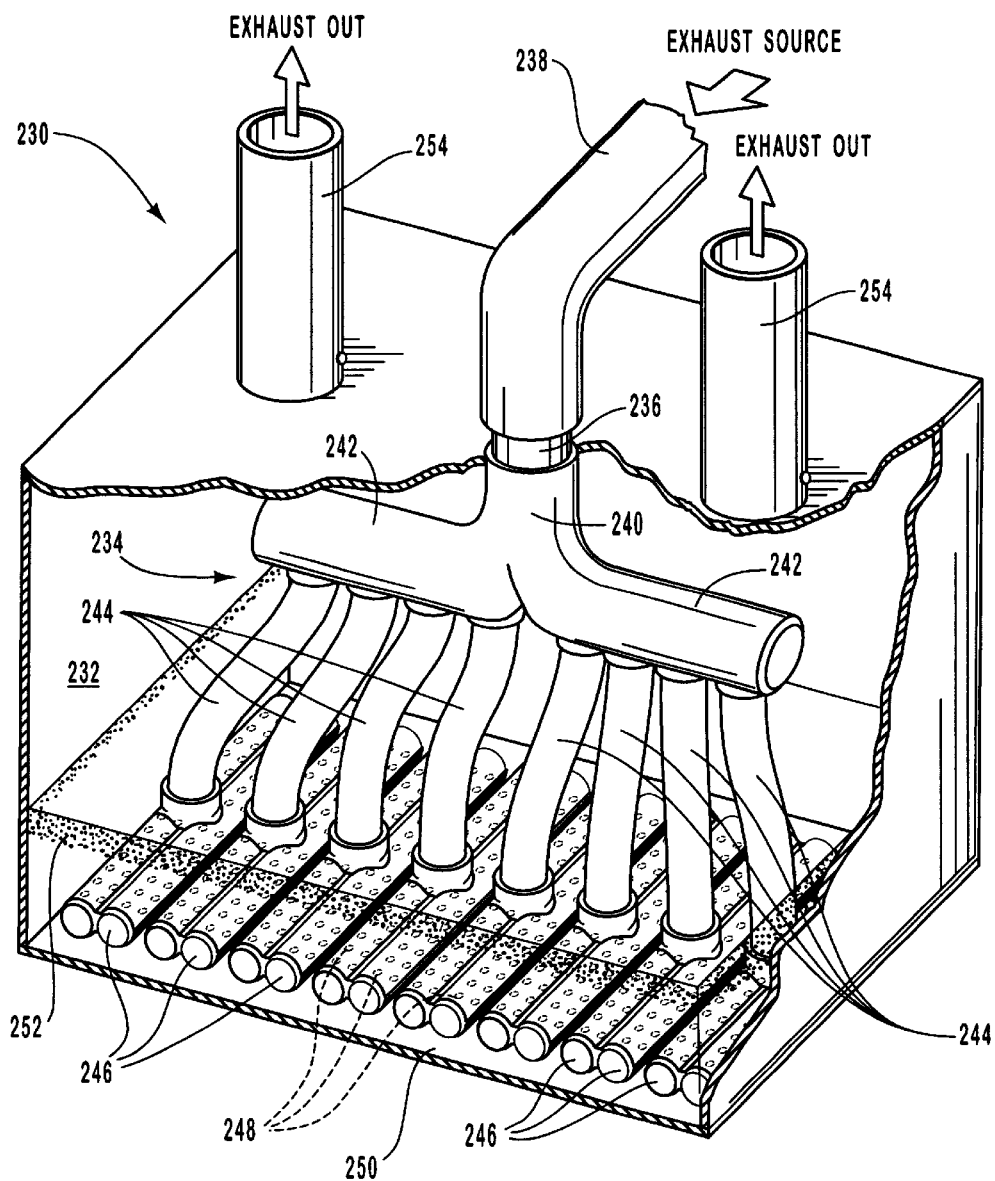
FIG. 8 is cut-away perspective view of a heavy-duty gas diffusion system according to the invention for diffusing gases within a reaction chamber of the invention.

Reference is now made to FIG. 8, which illustrates a cleaning system 230 that includes a reaction chamber 232 together with a more elaborate diffusion system 234 according to the invention. Diffusion system 234 was created in order to increase the flow of exhaust gases and reduce back pressure on the exhaust system of a 15 liter diesel engine of a diesel tractor used to pull a conventional trailer in a tractor-trailer combination.

Diffusion system 234 includes an input pipe 236 that receives waste exhaust gases from a diesel engine (not shown) or other source of waste exhaust gases generated by combusting a carbon-containing fuel. The waste exhaust gases may be delivered to input pipe 236 by means of a flexible or rigid hose 238. In communication with the input pipe 236 is a manifold 240 comprising a pair of manifold pipes 242 that extend away from each other. In communication with each manifold pipe 242 are a plurality of feeder pipes 244 (e.g., 4), which in turn communicate with a plurality (e.g., 2) of diffusion pipes 246. Each diffusion pipe 246 further includes a plurality of diffusion holes 248 oriented within an underside of each diffusion pipe 246 for directing exhaust gases toward the bottom 250 of the reaction chamber 232.

When in operation, the waste exhaust gases are delivered to the input pipe 236 of the diffusion system 243 by hose 238. The gases pass into the manifold 240, and into the feeder pipes 244 via the manifold pipes 242. The feeder pipes in turn deliver the gases to the diffusion tubes 246, which direct the gases toward the bottom 250 of the reaction chamber 232 via diffusion holes 248. The gases rise through a bed 252 of reactive particles, causing the particles to become at least partially fluidized or suspended. Finally, the treated gases exit the reaction chamber 232 via exhaust portals 254.

The exemplary diffusion system 234 depicted in FIG. 8 includes a single input pipe 236, a pair of manifold pipes 242, a total of eight feeder pipes 244, and a total of sixteen diffusion tubes 246. As such, the diffusion system 234 forms a generally rectangular structure capable of fitting within a reaction chamber, such as reaction chamber 232, having a generally rectangular cross section. It should be understood, however, that the diffusion system 234 may be modified as desired to accommodate other sizes and shapes of reaction chambers.

In one working embodiment, the input pipe 236 had an inner diameter of 5 inches, the manifold pipes 242 each had an inner diameter of 5 inches, the feeder pipes 244 had an inner diameter of 2 inches, the diffusion tubes 246 had an inner diameter of 1 inch, and the diffuision holes had a diameter of between 0.100 and 0.125 inch. The holes were each offset 400 from the bottom of diffusion pipes 246. The input pipe 236, manifold pipes 242, feeder pipes 244, and diffusion tubes 246 were made of iron.

Figure 9:
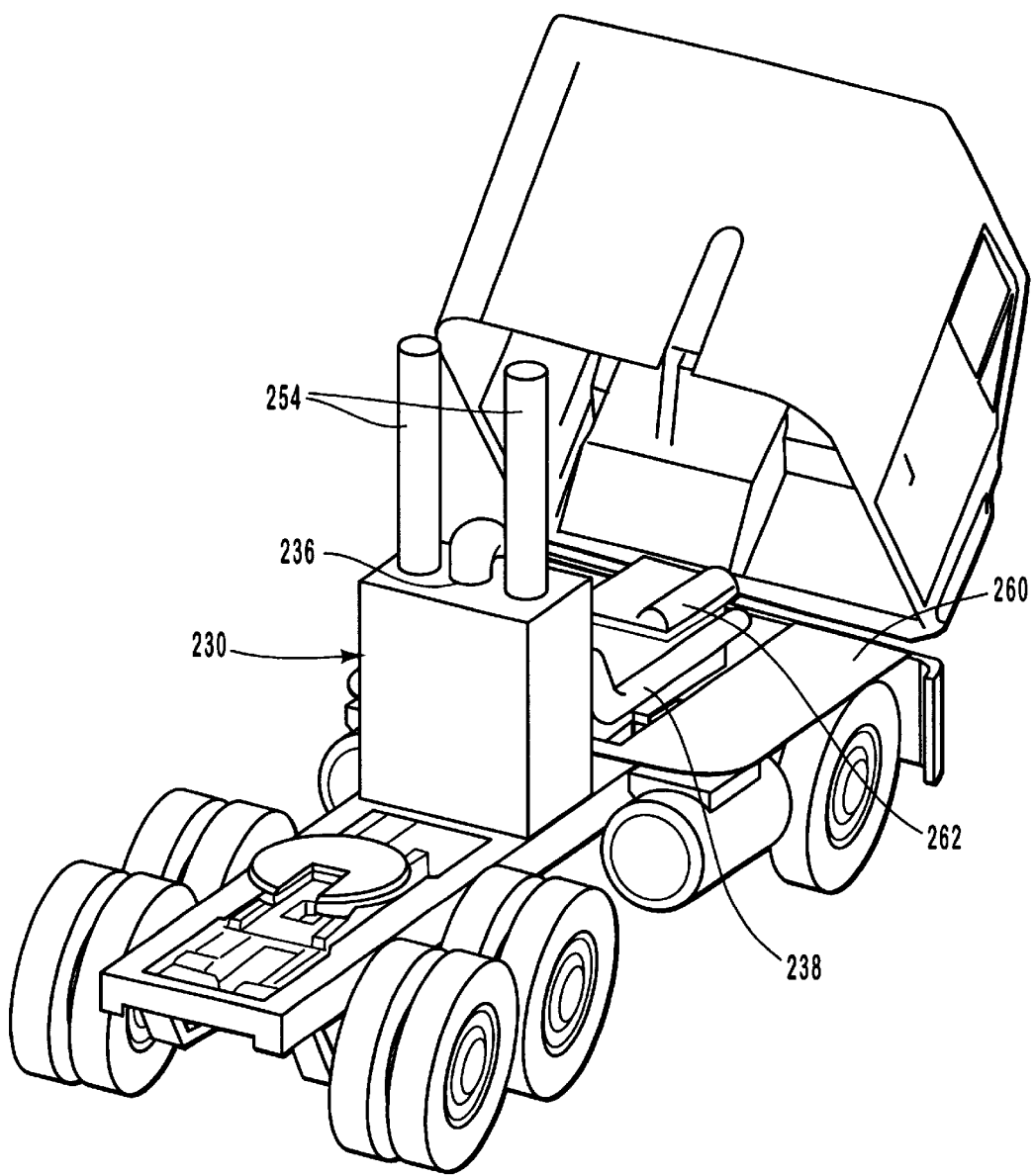
FIG. 9 depicts an inventive reaction chamber mounted on a diesel-powered truck.

FIG. 9 depicts a reaction chamber 230 mounted on a diesel tractor 260. An exhaust or pipe 238 channel 224 feeds exhaust gases generated by a diesel engine 262 into input pipe 236 that is, in turn, connected to a diffusion system (not shown) that introduces the gases within a bed of silica or other appropriate particulate system (not shown) capable of forming a degrading atmosphere of hydroxyl radicals. The treated exhaust gases exit the reaction chamber through one or more exhaust pipes 280.

III. TEST DATA

To date, numerous tests utilizing the inventive cleaning methods and systems, as well as precursor methods and systems that led up to the present methods and systems. Illustrative tests that demonstrate the veracity of the theories expressed herein, as well as the efficacy of the inventive methods and systems, and will now be discussed in more detail.

Test 1

Silica particles were suspended within a reaction chamber that was maintained at a temperature of 420–425° C. A piglet corpse weighing about 35–40 lbs. was placed into the reaction chamber and submerged within the fluidized silica sand. After 45 minutes, the reaction chamber was opened up and inspected. Nothing remained of the piglet corpse: there were no bones, no teeth, no tissues that could be detected, which proved that the media particles under the above-stated conditions became highly reactive and were able to completely oxidize or otherwise degrade the entire piglet corpse. That the silica sand was reactive rather than inert was demonstrated by the fact that the reaction chamber was kept at a temperature far below the temperature required for a corpse to combust or pyrolyze.

Whereas the foregoing example did not involve the use of a reaction chamber to clean waste exhaust streams generated by the combustion of carbon-containing fuels, it did demonstrate that silica, rather than being entirely inert, was found to be able to generate a highly degrading atmosphere that apparently included hydroxyl radicals under certain conditions.

Test 2

Waste tissues and other organic materials were placed within a reaction chamber on a regular and ongoing basis. The reaction chamber was operated according to the methods disclosed herein and maintained at a temperature of 300–375° C. It was found that an afterburner was not needed to bum off excess gases during operation of the reaction chamber, since essentially no flammable gases could be detected. It was determined that the medical wastes and other organic matter that were disposed were completely oxidized or otherwise degraded, leaving no detectable solid residue except for a quantity of ash. The quantity of the ash that remained after disposal was found to be about 2% by weight of the organic matter that was initially disposed. Nor were any noxious gases produced. Instead, the exhaust gases were substantially free of pollutants. The most preferred operating temperature was determined to be within a range from about 300° C. to about 375° C.

Test 3

A reaction chamber similar to the one depicted in FIG. 3 and which included silica sand as the catalytically reactive media was adapted for use with a diesel engine. The diesel engine that was utilized for this experiment included a pair of exhaust pipes at the rear of the vehicle. A pair of rubber hoses were attached to the respective pair of exhaust pipes and joined together in a Y union to form a single exhaust conduit leading to the underside of the reaction chamber. A heating/compressor unit was also used in conjunction with the reaction chamber in order to introduce heated air under pressure into the reaction chamber as needed in order to provide a fluidized bed of silica sand heated to a temperature in a range from about 200° C. to about 375° C. In addition, a series of tubes configured and arranged so as to sample untreated exhaust gases as well as treated exhaust gases were interfaced with various analytical devices in order to test the level of waste products in the exhaust gases both before and after treatment by the reaction chamber.

In order to establish a benchmark for how much degradation and cleaning of the exhuust gases was being carried out by the reaction chamber, untreated exhaust gases were fed through a draw tube and caused to pass through a filter paper for a period of ten minutes in order to trap waste exhaust particulates, i.e. soot. After 10 minutes the filter paper was removed and inspected. A very noticeable buildup of black carbon soot was found on the filter paper.

Thereafter, exhaust gases that were treated by means of the reaction chamber were fed into a draw tube and caused to pass through a filter paper for a period of 10 minutes. Subsequent inspection of the filter paper revealed a remarkable drop in the level of soot that was collected, perhaps up to 95% or more. Whereas the untreated exhaust gases caused a build up of black soot on the filter paper that was easily transferred to a person's fingers, the treated exhaust yielded a faintly gray build up of material that did not easily rub off. Whereas these respective buildups of soot were not quantified a visual inspection showed a drop of at least 75–95% of soot compared to the untreated exhaust.

In addition, the level of carbon monoxide was measured both before and after treatment with the reaction chamber and found to be reduced by about 90%. This indicated that the catalytically reactive media particles were able to catalytically oxidize, or otherwise eliminate, carbon monoxide in a short period of time as the waste exhaust gases rose through the catalytically reactive silica particles.

In addition, the level of nitrogen oxides ($NO_x$) was measured both before and after treatment with the reaction chamber and were also found to be reduced by about 90%. This indicated that the catalytically reactive media particles were able to catalytically eliminate nitrogen oxides in a short period of time as the waste exhaust gases rose through the catalytically reactive silica particles. They were most likely reformed into silicon nitride. Alternatively, they may have been reduced to nitrogen gas as the carbon, carbon monoxide and hydrocarbons were oxidized to carbon dioxide.

This experiment was repeated numerous times and each time there was a noticeable drop in the level of carbon soot, carbon monoxide and nitrogen oxides as a result of passing the waste exhaust gases through the reaction chamber. This demonstrated that the silica particles are catalytically reactive since merely passing a stream of exhaust gases through an inert bed would not be expected to cause further degradation or cleaning of any incomplete combustion products found therein. The dramatic increase in the rate and extent of elimination of the incomplete combustion products strongly indicates the catalytic capabilities of silica sand relative to waste exhaust gases.

Through subsequent experiments it was found that about 100 pounds of silica sand is adequate to catalytically degrade up to 95% of the incomplete combustion products produced by a diesel engine having a displacement of 400 cubic inches. Moreover, it was found that the silica sand did not degrade but could be used almost indefinitely without being depleted. Of course, in the event that the reaction chamber needs to be recharged with silica sand, it can be done so at very low cost. Sand is a very inexpensive commodity compared to conventional catalysts.

Test 4

Further experiments were carried out using the apparatus described in Example 3, except that the silica sand was not fluidized as much but was kept in only a slightly elevated state. Furthermore, after the diesel engine was warmed up all auxiliary heat was cut off such that the only heat input into the reaction chamber was provided by the diesel engine exhaust. A series of measurements indicated that the temperature leveled off and remained at about 180° C. The treated exhaust gases were sampled and found to be virtually emission free. In particular, the filter paper used to sample particulates from the treated gases remained virtually clean over time (i.e. after sampling for more than 10 minutes), which indicated that over 99% of the particulates were being degraded and eliminated without any additional heat inputs.

Thereafter, large filter paper was placed over the opening of the exhaust stack itself for at least 10 minutes to ensure that the sampling techniques used above were not flawed in some way. The large filter paper was examined and appeared to be virtually clean, which indicated that virtually no particulates were passing through the reaction chamber and into the atmosphere. In short, simply passing waste exhaust gases through a slightly fluidized bed of ordinary silica sand resulted in the virtual elimination of all waste particulates found in diesel engine exhaust. This test confirms that ordinary silica sand can behave as a powerful catalyst in catalytically oxidizing, or otherwise degrading, incomplete combustion products of diesel fuel at temperatures as low as about 180° C. without the use of expensive conventional catalysts.

Test 5

A reaction chamber containing silica is used to remove up to 98% of the soot and other unburnt carbonaceous materials emitted in the flue gas from an industrial burner that utilizes coal or fuel oil. Carbon monoxide and nitrogen oxides are also greatly reduced. Because the industrial plant is stationary, and because silica is extremely inexpensive, an amount of silica appropriate for oxidizing the unburnt components from the industrial burners is used. The temperature is maintained within a range from about 30° C. to about 500° C. by appropriate means, and the moisture content of the gases within the reaction chamber is maintained by appropriate means, such as by, e.g., a humidifier.

Test 6

A reaction chamber containing a fluidized bed of silica was used to catalyze the incomplete combustion products from a 1990 Geo Metro having approximately 125,000 miles. A conventional emission tester was used to determine the hydrocarbon and carbon monoxide levels both before and after passing the exhaust through the inventive reaction chamber. The 1990 Geo Metro was equipped with a factory-installed catalytic converter, which was left in place to determine if the inventive reaction chamber would further remove unburnt gases and particulates produced by a gasoline-powered engine but not catalytically oxidized by the catalytic converter.

Normal levels of hydrocarbons and carbon monoxide were measured by inserting the sampling pipe into the exhaust pipe of the Geo Metro, which is the standard practice. While running at a speed of 2338 RPMs and no load the Geo Metro was tested for emissions. The hydrocarbon level was determined to be 1412 ppm, while the concentration of CO was detected as 0.29%.

Thereafter, the exhaust stream was diverted and passed directly through the reaction chamber. In order to prevent dilution of the exhaust gases all external sources of air flow, such as heated air inputs, were curtailed. Only the exhaust gases from the Geo Metro were introduced into the reaction chamber during the testing procedure. After correcting for dilution, the hydrocarbon level was determined to be only 22 ppm, while the concentration of CO was measured as 0.00%. This means that the reaction chamber of the invention reduced the hydrocarbon level by about 98.5% while removing virtually all of the CO, or over 99% of the CO. The foregoing test demonstrated that the inventive methods and systems were better able to remove CO and unburnt hydrocarbons more efficiently and completely than standard catalytic converters.

Test 7

A reaction chamber containing a fluidized bed of silica was used to catalyze the incomplete combustion products from a 1984 STD Mercedes Benz Diesel. A conventional emission tester was used to determine the hydrocarbon and carbon monoxide levels both before and after passing the exhaust through the inventive reaction chamber. The 1984 STD Mercedes Benz Diesel had no catalytic converter since they are not used with diesel engines due to their ineffectiveness.

Normal levels of hydrocarbons and carbon monoxide were measured by inserting the sampling pipe into the exhaust pipe of the Mercedes Benz Diesel, which is the standard practice. While running at a speed of at least about 2000 RPMs and no load the Mercedes Benz Diesel was tested for emissions. The hydrocarbon level was determined to be 219 ppm, while the concentration of CO was detected as 2.02%.

Thereafter, the exhaust stream was diverted and passed directly through the reaction chamber. In order to prevent dilution of the exhaust gases all external sources of air flow, such as heated air inputs, were curtailed. Only the exhaust gases from the Mercedes Benz Diesel were introduced into the reaction chamber during the testing procedure. After correcting for dilution, the hydrocarbon level was determined to be 0 ppm, while the concentration of CO was measured as 0.01%. This means that the reaction chamber of the invention reduced virtually all of the hydrocarbons, or over 99%, while removing about 99.5% of the CO.

Test 8

The reaction chamber and silica bed that had been repeatedly and extensively used to waste exhaust gases from the Mercedes Benz Diesel described in Test 7 was examined. The interior wall of the reaction chamber, as well as the exhaust conduit leading out of the reaction chamber, both of which comprised stainless steel, were completely clean and free of soot, oils and other substances found in diesel exhaust. This indicates that the soot, oils and other waste products were degraded and cleaned before they had a chance to deposit on the reaction chamber walls and exhaust conduit.

Various samples of the silica bed, which was about 2 inches deep during normal operation, were examined macroscopically and under a microscope. No traces of soot, oils or other substances normally found in diesel exhaust were detected, indicating that the bed of silica is reactive and does not merely act as a filter or depositing substrate for the waste products found in the diesel exhaust. It also indicates that the silica bed was very efficient in degrading and cleaning the pollutants found in the exhaust gases since they did not collect in the silica faster than they were destroyed.

A diffusion system similar to the one illustrated in FIG. 6 was used to introduce waste exhaust gases into the reaction chamber. The diffusion system was examined by visual external examination and, later, by being cut apart, to identify the location of the sooty and oily deposits from the waste exhaust gases in an effort to understand more about the manner in which the incomplete combustion products are actually destroyed or cleaned. Visual external examination of the diffusion pipes indicated that the diffusion holes were completely clean and free of soot, oils or other substances normally found in diesel exhaust. It also appeared that the area within the diffusion pipes immediately surrounding the diffusion holes was also clean. This seemed to indicate that degradation and cleaning of the waste exhaust gases was possibly commenced even before the gases actually entered the reaction chamber and contacted, or diffused between, the silica particles.

The central pipe that fed the waste exhaust gases to the various diffusion pipes, which was 5 feet long, was separated from the diffusion pipes and cut apart in various locations. To the surprise of the inventors, the interior surface of each diffusion pipe was entirely clean and free from soot and oily substances. Moreover, only a portion of the central pipe interior surface was coated with soot and oily substances found in diesel exhaust. The central pipe was entirely clean and free from sooty and oily deposits from the point where it intersected with the diffusion pipes up to approximately 3 feet above this intersection. On the other hand, the first 2 feet of the central pipe contained heavy deposits of oily soot on the interior surface. Moreover, the change from clean to dirty was abrupt rather than gradual, which seems to rule out the idea that the exhaust gases simply became cleaner as they traveled through the diffusion system as a result of surface deposition.

The only substance found within the diffusion pipes and the clean 3 foot portion of the central pipe was a thin coating of an orangish crystalline material that was essentially tasteless and which had the appearance of a glassy or glass-like material. It is speculated that this material includes a form of silicon, such as silicon carbide or nitride. A glassy substance was also found on the surface of rocks that were placed in the reaction chamber beneath the bed of silica, further providing evidence that deposition of some form of silicon or other glassy substance is occurring in connection with the removal of soot and other incomplete combustion products.

This startling discovery indicates the degrading atmosphere generated within the reaction chamber is apparently somehow able to migrate partially up into the gas diffusion system such that the degradation of the waste exhaust gases actually occurs, or at least begins, in the gas diffusion system rather than merely within the reaction chamber itself and in the immediate vicinity of the silica particles. Why this occurs is surprising since the hydroxyl radicals and/or other reactive moieties seem to have traveled countercurrent to the flow of exhaust gases. Perhaps some sort of highly charged region of excited electrons is created, perhaps through an interaction between the silica particles, hydroxyls and iron pipes, that are at least partially responsible for breaking down the pollutants.

Test 9

Waste exhaust gases produced by a Geo Metro were found to contain 0.90% $CO_2$ and 17.30% oxygen gas ($O_2$). After treating the exhaust gases using a reaction chamber according to the invention, the treated gases were found to contain a reduced amount of $CO_2$ (virtually none) and an increased amount of $O_2$ (20.1%). This seems to indicate that the inventive methods and systems are able to somehow reduce $CO_2$ while generating $O_2$.

Test 10

Waste exhaust gases produced by a Mercedes Benz diesel engine were found to contain 13.90% $CO_2$ and 2.90% $O_2$.

After treating the exhaust gases using a reaction chamber according to the invention, the treated gases were found to contain a reduced amount of $CO_2$ (between 0.40% and 2.70%) and an increased amount of $O_2$ (between 16.90% and 20.50%). This appears to confirm that the inventive methods and systems are able to reduce $CO_2$ and generate $O_2$.

IV. SUMMARY

In conclusion, the present invention provides methods and systems that effectively and inexpensively eliminate, or at least substantially reduce, the quantity of unburnt or partially burnt combustion products produced by diesel engines and other internal combustion engines in an economically feasible manner.

The invention further provides methods and systems for eliminating, or at least greatly reducing, the quantity of incomplete combustion products produced by diesel engines, industrial burners, and other systems that burn fossil fuels, thereby eliminating the need for expensive catalysts, such as palladium, platinum and other rare and expensive metals.

The invention also provides methods and systems that can be easily adapted, such as by upscaling or downscaling, in order to catalytically degrade waste combustion products produced by virtually any system that burned carbon-containing fuels, such as diesel trucks, trains, other vehicles, power plants, metal smelters, and virtually any industrial burner.

The invention additionally provides methods and systems that are able to reduce the quantity of $CO_2$ that is emitted into the atmosphere as a result of the burning of fossil fuels or other carbon-containing fuels.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for cleaning exhaust gases produced during combustion of carbon-containing fuel, comprising:
    step for producing exhaust gases through combustion of carbon-containing fuel;
    step for generating a degrading atmosphere of hydroxyl radicals by means of an interaction between water and at least one of silica or alumina at a temperature of less than about 500° C.; and
    step for cleaning at least a portion of said exhaust gases through interaction between said exhaust gases and said degrading atmosphere of hydroxyl radicals and in the absence of palladium or platinum catalysts.

2. A method for cleaning exhaust gases as defined in claim 1, wherein the step for producing exhaust gases is performed by at least one of a diesel engine or an industrial burner.

3. A method for cleaning exhaust gases as defined in claim 2, wherein the step for producing exhaust gases includes burning a fossil fuel.

4. A method for cleaning exhaust gases as defined in claim 1, wherein the step for producing exhaust gases includes burning a fuel selected from the group consisting of fermentation products, derivatives of fermentation products, wood, and biomass.

5. A method for cleaning exhaust gases as defined in claim 1, wherein the step for generating a degrading atmosphere of hydroxyl radicals is carried out within a reaction chamber including therein a bed consisting essentially of silica particles.

6. A method for cleaning exhaust gases as defined in claim 5, wherein said silica particles are at least partially fluidized or suspended by means of introducing said exhaust gases into said bed at a pressure greater than atmospheric pressure.

7. A method for cleaning exhaust gases as defined in claim 6, wherein said exhaust gases are introduced into said reaction chamber by means of at least one diffusion pipe having at least diffusion hole therein.

8. A method for cleaning exhaust gases as defined in claim 7, wherein the step for cleaning at least a portion of said exhaust gases is carried out at least in part external to said reaction chamber.

9. A method for cleaning exhaust gases as defined in claim 1, wherein the step for generating a degrading atmosphere of hydroxyl radicals as carried out within a reaction chamber including therein a bed consisting essentially of alumina particles.

10. A method for cleaning exhaust gases as defined in claim 1, wherein the step for generating a degrading atmosphere of hydroxyl radicals is carried out at a temperature in a range of about 50° C. to about 400° C.

11. A method for cleaning exhaust gases as defined in claim 1, wherein the step for generating a degrading atmosphere of hydroxyl radicals is carried out at a temperature in a range of about 75° C. to about 350° C.

12. A method for cleaning exhaust gases as defined in claim 1, wherein the step for generating a degrading atmosphere of hydroxyl radicals is carried out at a temperature in a range of about 100° C. to about 300° C.

13. A method for cleaning exhaust gases as defined in claim 1, wherein the step for cleaning at least a portion of said exhaust gases involves at least partial elimination of at least one incomplete combustion product of a carbon-containing fuel, said at least one incomplete combustion product being selected from the group consisting of carbon-containing particulates, soot, hydrocarbons, oily substances, hydrogen gas, and carbon monoxide.

14. A method for cleaning exhaust gases as defined in claim 1, wherein the step for cleaning at least a portion of said exhaust gases involves at least partial elimination of carbon dioxide produced during combustion of a carbon-containing fuel.

15. A method for cleaning exhaust gases as defined in claim 14, wherein the step for cleaning at least a portion of said exhaust gases involves an increase in oxygen content of the exhaust gases.

16. A method for cleaning exhaust gases as defined in claim 1, wherein the step for cleaning at least a portion of said exhaust gases involves at least partial elimination of at least one of $NO_x$ and $SO_2$ produced during combustion of a carbon-containing fuel.

17. An apparatus comprising means for carrying out the method of claim 1.

18. A method for cleaning exhaust gases as defined in claim 1, wherein the step for producing exhaust gases is performed by an internal combustion engines.

19. A method for cleaning exhaust gases produced during combustion of carbon-containing fuel, comprising:
    producing exhaust gases by combusting carbon-containing fuel within a combustion chamber;
    generating a degrading atmosphere comprising hydroxyl radicals by passing said exhaust gases through a reaction chamber comprising a bed of particles comprising at least one of silica or alumina at a temperature of less than about 500° C. without first passing the exhaust gases through a catalytic converter comprising palladium or platinum; and cleaning at least a portion of said exhaust gases by interacting said exhaust gases with said degrading atmosphere of hydroxyl radicals so as to at least partially eliminate at least a portion of at least one combustion product of a carbon-containing fuel, wherein said at least one combustion product is selected from the group consisting of carbon-containing particulates, soot, hydrocarbons, oily substances, carbon monoxide, and carbon dioxide.

20. A method for cleaning exhaust gases as defined in claim 19, wherein the exhaust gases are produced by a diesel engine.

21. A method for cleaning exhaust gases as defined in claim 20, wherein the degrading atmosphere of hydroxyl radicals clean at least a portion of the waste exhaust gases external to said reaction chamber.

22. A method for cleaning exhaust gases as defined in claim 19, wherein said bed of particles consists essentially of silica.

23. A method for cleaning exhaust gases as defined in claim 19, wherein the exhaust gases are produced by an industrial burner.

24. A method for cleaning exhaust gases as defined in claim 19, wherein the exhaust gases are produced by an internal combustion engine.

25. An apparatus comprising means for carrying out the method of claim 19.

26. A method for cleaning exhaust gases produced during combustion of carbon-containing fuel, comprising:

producing exhaust gases containing at least one combustion product of a carbon-containing fuel by means of a diesel engine, wherein said at least one combustion product is at least one of carbon-containing particulates, soot, hydrocarbons, oily substances, carbon monoxide, or carbon dioxide;

generating a degrading atmosphere of hydroxyl radicals within a reaction chamber by passing said exhaust gases into a particulate bed consisting essentially of silica at a temperature of less than about 500° C.; and cleaning said exhaust gases in a manner so that said at least one combustion product is at least partially eliminated through interaction with said degrading atmosphere of hydroxyl radicals.

27. A method for cleaning exhaust gases as defined in claim 26, wherein the silica comprises silica sand.

28. An apparatus comprising means for carrying out the method of claim 26.

* * * * *

UNITED STATES PATENT AND TRADEMARK OFFICE
CERTIFICATE OF CORRECTION

PATENT NO.    : 6,520,287 B2
DATED         : February 18, 2003
INVENTOR(S)   : Thomas C. Maganas and Alan L. Harrington It is certified that error appears in the above-identified patent and that said Letters Patent is hereby corrected as shown below:

Column 3,
Line 7, before "fossil" change "bum" to -- burn --

Column 6,
Line 2, after "entirely" change "understand" to -- understood --

Column 12,
Line 39, after "such" change "a" to -- as --

Column 13,
Line 24, before "introduced" change "canbe" to -- can be --

Column 18,
Line 31, before "components" change "unbumt" to -- unburnt --

Signed and Sealed this

Tenth Day of June, 2003

JAMES E. ROGAN
*Director of the United States Patent and Trademark Office*